United States Patent Office 3,341,976
Patented Sept. 19, 1967

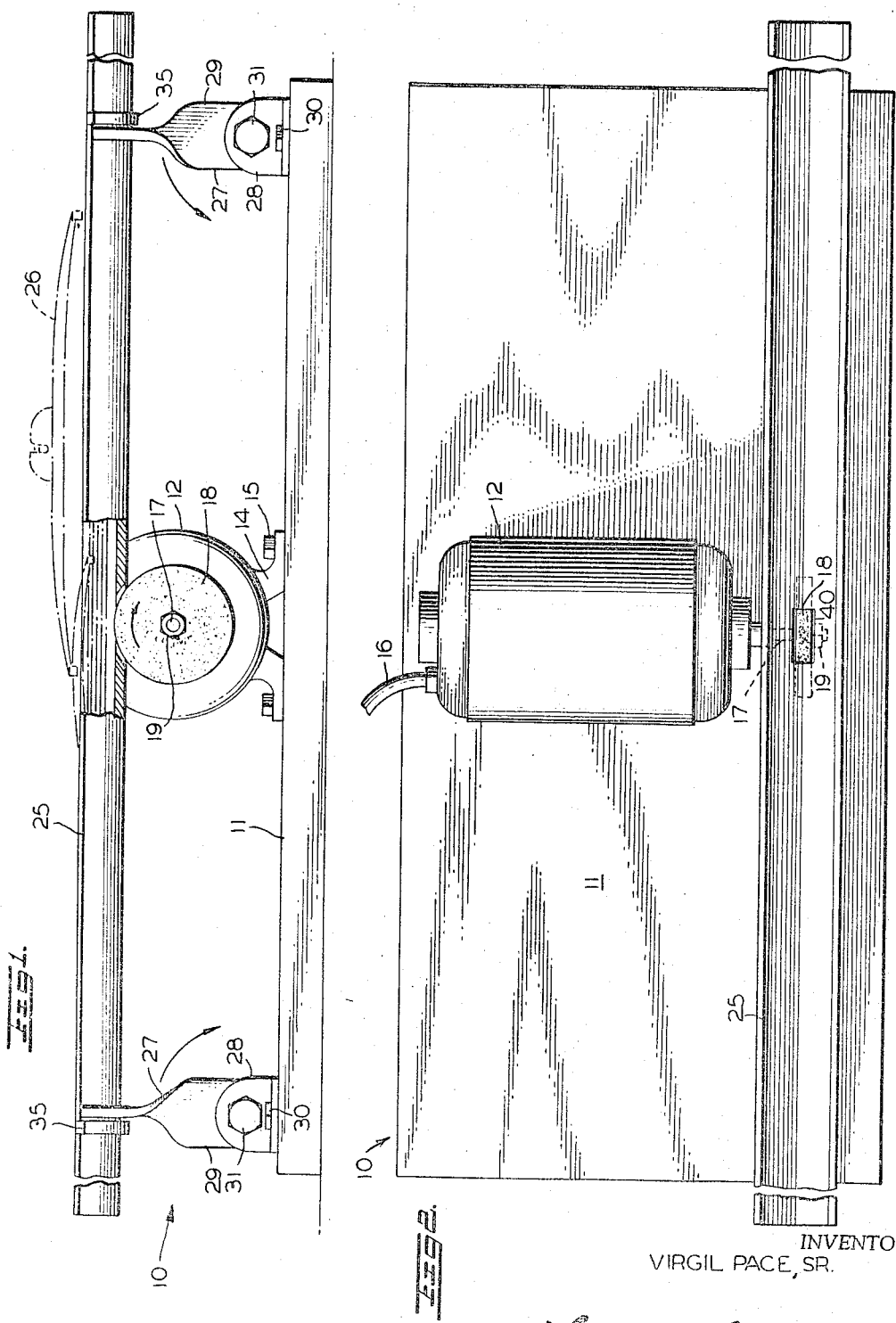

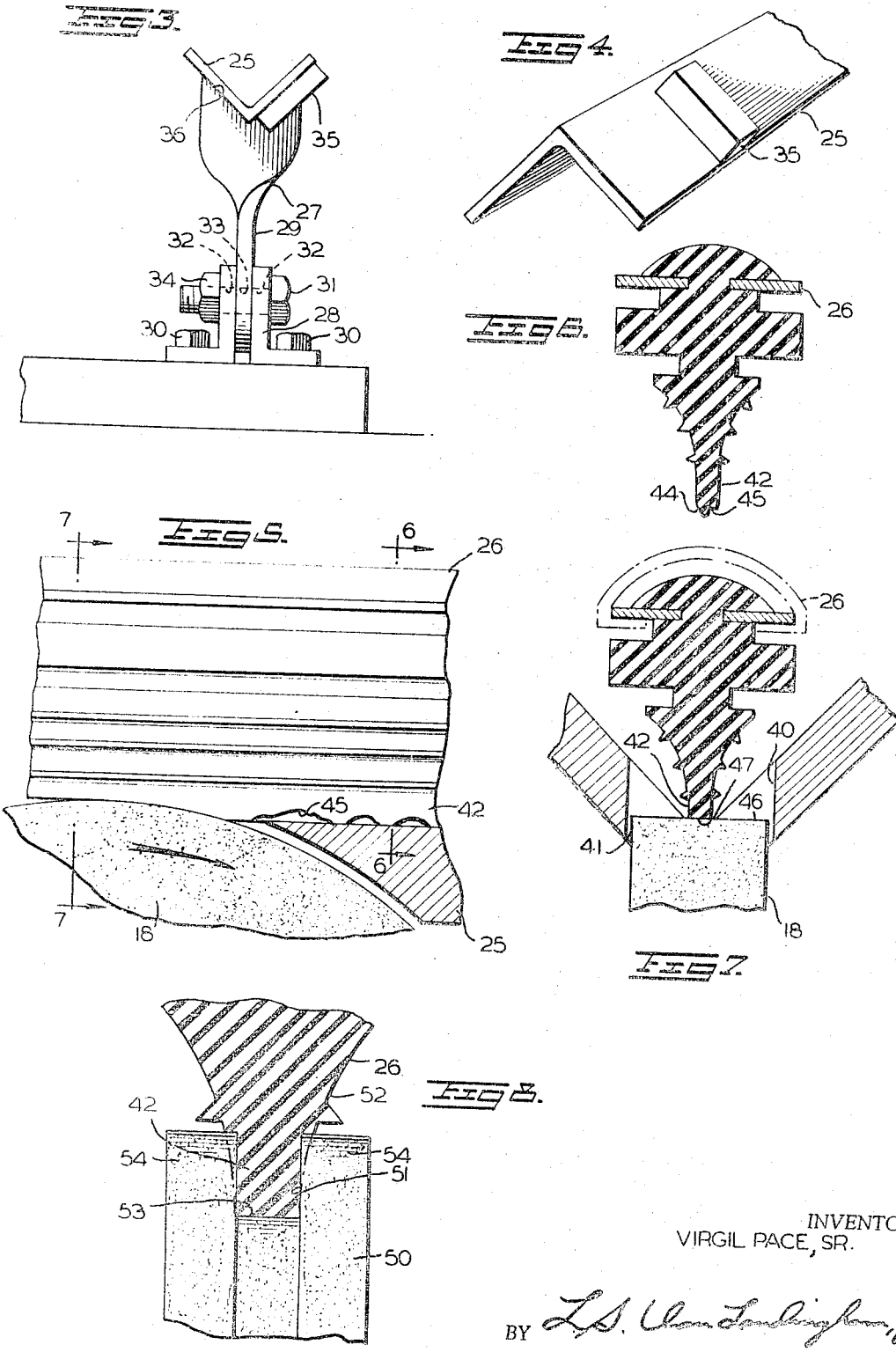

3,341,976
APPARATUS FOR RENOVATING WINDSHIELD
WIPER BLADES
Virgil Pace, Sr., 307 S. 23rd Ave.,
Hattiesburg, Miss. 39401
Filed Nov. 20, 1964, Ser. No. 412,634
4 Claims. (Cl. 51—102)

ABSTRACT OF THE DISCLOSURE

Apparatus is provided for renovating windshield wiper blades by abrading damaged areas from the wiping edge with an abrasive disc. The apparatus includes improved pivotable supporting means for an elongated longitudinally extending guide member which allows the depth of the cut taken by the abrasive disc to be adjusted by pivoting the supporting means.

---

This invention relates to an improved apparatus for renovating worn or damaged windshield wiper blades.

Windshield wiper assemblies of the type commonly employed for clearing rain, snow and the like from defined areas of vehicular windshields normally include a wiper blade which is attached to an actuating arm that is moved back and forth across the windshield to thereby maintain a clear field of vision. The wiper blade includes a wiping edge constructed of a flexible, resilient material such as rubber, that is largely responsible for the efficiency of the wiping or cleaning action. With continued use, the wiping edge is subject to normal abrasive wear, and also to cuts, tears and other damage due, for example, to adhesion of the wiping edge to ice or passing over sharp pieces of ice during the winter months and adhesion to the hot glass of the windshield during the summer months. Careless handling by service personnel is also a factor in damaging the wiping edge. The wiping edge also is rendered less efficient due to deterioration such as hardening or oxidation of the rubber, and small particles of dust and dirt becoming embedded in the surface.

The normal wearing, deterioration and damage to the wiping edge results in a marked loss in the wiping efficiency, and heretofore wiper blades had to be replaced with new ones at frequent intervals. The cost of replacement wiper blades for operating a fleet of taxicabs or trucks is often very substantial. Accordingly, the art has long sought an entirely satisfactory low cost method and apparatus for renovating used wiper blades and thereby increase the useful life several fold without appreciable loss of wiping efficiency.

It is an object of the present invention to provide an improved apparatus for renovating used windshield wiper blades.

Still other objects and advantages of the invention will be apparent to those skilled in the art upon reference to the following detailed description and the drawings, wherein:

FIGURE 1 is a side elevational view, partially in section and with portions thereof being broken away, of the apparatus of the invention for use in renovating windshield wiper blades;

FIGURE 2 is a plan view of the apparatus of the invention illustrated in FIGURE 1, with the wiper blade being omitted in the interest of clarity;

FIGURE 3 is an enlarged fragmentary end elevational view of the apparatus of FIGURES 1 and 2, with the electric motor and emery wheel being omitted in the interest of clarity;

FIGURE 4 is an enlarged fragmentary perspective view of the end of the windshield wiper blade guide illustrated in FIGURE 3, further illustrating the underside thereof;

FIGURE 5 is an enlarged, fragmentary elevational view of the portion of FIGURE 1 in section with portions thereof being broken away, further illustrating the apparatus of the invention;

FIGURE 6 is a cross sectional view of a portion of the wiper blade to be renovated, taken along the line 6—6 of FIGURE 5;

FIGURE 7 is an enlarged fragmentary cross sectional view of a portion of the wiper blade after renovation, taken along the line 7—7 of FIGURE 5; and FIGURE 8 is an enlarged cross sectional view, similar to that of FIGURE 7, of the wiper blade after renovation, but which illustrates a different type of abrasive disc for use with badly worn or damaged wiper blades.

Referring now to the drawings and more particularly to FIGURES 1 and 2, the apparatus of the invention for renovating used windshield wiper blades generally designated as 10 may include a base 11 on which an electric motor is mounted by means of supports 14 and bolts 15. The motor 12 may be supplied with electric current from a convenient source by means of an electric cord 16. The motor 12 drives shaft 17, on the outer end of which is mounted an abrasive disc 18 which may be of the type commonly referred to as an emery wheel. The disc 18 is retained on the outer end of shaft 17 by means of nut 19 and as may be best seen in FIGURE 2, it is relatively thin. As is further illustrated in FIGURE 7, the periphery or grinding surface thereof may be relatively flat, or it may have a centrally located annular slot formed therein as is illustrated in FIGURE 8.

An elongated guide 25 for the used windshield wiper blade 26 to be renovated is mounted on base 11 by supports 27 located near each end. The supports 27 include pairs of base or mounting portions 28, the cooperating members of each of which are spaced apart a distance sufficient to receive the upper portions 29, as is best seen in FIGURE 3. The mounting portions 28 are attached to base 11 by means of bolts 30, and in each instance a bolt 31 passes through the openings 32 in mounting portion 28 and the opening 33 in upper portions 29, and is retained in place by means of a nut 34. The tolerances are such that the upper portions 29 are free to rotate around bolt 31 and thus are movable inward toward the electric motor 12, as is illustrated by the arrows in FIGURE 1. This feature enables the effective height of the supports 27 to be adjusted.

As is best seen in FIGURES 3 and 4, the guide 25 may have a generally V-shaped configuration and rests in V-shaped slots 36 in the upper portions 29 of supports 27.

The guide 25 is also provided with a centrally arranged, longitudinally extending slot 40 which is located so as to be immediately above the abrasive disc 18, and to extend across its width. This arrangement assures that the disc 18 is free to extend upward a substantial distance in slot 40, such as is best seen at 41 in FIGURE 7. The distance at 41 is determined by the height of the supports 27, which in turn may be varied up and down somewhat by swinging the portions 29 inward or outward toward the electric motor 12, thereby allowing the disc 18 to extend further upward or downward in slot 40. Thus, substantially any desired depth of cut may be taken from the wiping edge 42 of blade 26 to thereby renovate it properly.

As is best seen in FIGURES 5 and 6, the used wiper blade 26 to be renovated may have relatively minor damage to the wiping edge 42, such as the rounded corners 44 and the nicks 45. In such instances, the abrasive disc 18 having a flat peripheral or grinding surface 46 such as that shown in FIGURES 1, 2, 5 and 7, is preferably used. The abrasive disc 18 extends upward into the slot 40 a sufficient distance to assure that the rounded corners 44 and nicks 45 are removed by abrasion upon slowly passing the used wiper blade 26 along the bottom of the V-shaped guide 25, across the slot 40, and into contact with the rapidly rotating disc 18. Thus, the damaged portion on the lower or outer end of the wiping edge 42 is removed, and the outer end of wiping edge 42 is now flat and forms 90° angles at the edges as is illustrated at 47 in FIGURE 7. The renovated wiper blade 26 may be returned to the windshield wiper assembly for an automobile, truck, bus or other type of vehicle, and used in the same manner as if it were a new wiper blade. The efficiency of the renovated blade is substantially equal to that when the blade was new.

In instances where the wiper blade 26 to be renovated has a wiping edge 42 of greatly reduced length, and therefore it is no longer flexible as it must be for good wiping efficiency, it is necessary to renew both the length of the wiping edge 42 and the damaged terminal end thereof. This may be accomplished by employing the abrasive disc 50, which is illustrated in FIGURE 8. The abrasive disc 50 is provided with an annular, centrally located slot 51 having a width which is substantially the same as that desired for the wiping edge 42. The slot 51 is positioned substantially in the center of the slot 40 in guide 25, and thus upon operating the electric motor 12 and rotating the abrasive disc 50 at high speed, the abrasive shoulders 54 on either side of slot 51 remove a portion of the rubbery body 52 of blade 26 to thereby lengthen the wiping edge 42, and simultaneously the peripheral surface 53 renews the outer end 47 as described previously to thereby form a renovated end 47.

Surprisingly, it has been found that even when the body 52 of wiper blade 26 has aged to an extent that the rubber is relatively inflexible to the touch, when the outer surfaces thereof are ground away as described above to thereby produce a lengthened renovated wiping edge 42, the new wiping edge 42 has good flexibility and is similar to a new blade. Thus, it is possible to renovate a relatively new wiper blade a number of times using the flat surfaced abrasive disc 18 illustrated in FIGURES 1, 2, 5 and 7, until the wiping edge 42 is worn away and is stiff and inflexible, and then lengthen the wiping edge and restore its flexibility with the abrasive disc 50 illustrated in FIGURE 8 to further extend the life without appreciable loss of wiping efficiency.

The operation of the apparatus will now be described more fully. When renovating the wiper blade 26 illustrated in FIGURE 6, which has not been damaged extensively, the flat surfaced grinding disc illustrated in FIGURES 1, 2, 5 and 7 is employed. The wiper blade 26 is positioned as is shown in FIGURE 1, and the supports 27 are adjusted in height to assure that the upper peripheral surface of abrasive disc 18 extends approximately 1/32 to 1/16 inch upward into the slot 25, or a distance so as to assure that all of the nicks 45 and unsound rubber are removed by abrasive action of the disc 18, but not so far as to unduly remove sound rubber from the wiping edge 42. Then, the electric motor is started, thereby driving the abrasive disc 18 very rapidly in the direction of the arrows. The wiping blade 26 is then passed slowly by hand along the bottom of the V-shaped guide 25, across the slot 40, and into contact with the peripheral surface of abrasive disc 18. The damaged lower or outer portion of the wiping edge 42 is removed by abrasive action of the disc 18. This produces the renovated surface 47 on the outer end, as illustrated in FIGURE 7, which is flat and has substantially 90° corners on the terminal portion of the wiping edge 42. This procedure may be repeated a number of times, if desired, in the event that all of the nicks 45 are not removed on the first pass. The renovated wiper blade then may be returned to the windshield wiper assembly of the vehicle, and used in the usual manner with greatly improved wiping efficiency.

When the wiper blade is again damaged, the above procedure may be repeated as many times as desired until the leading edge 42 is no longer flexible due to its decreasing length and the increasing width of the rubber in the body portion 52. When this occurs, it is necessary to employ the type of abrasive disc 50 which is illustrated in FIGURE 8. The general procedure used above for the disc 18 is repeated, with the exception of substituting the abrasive disc 50 for the abrasive disc 18. The body portion 52 contacts the shoulders 54 which are likewise abrasive and thus grind away a portion and lengthen the wiping edge 42. In so doing, the wiping edge 42 extends into the slot 51, thereby ultimately contacting the flat surface 53 and removing nicks 45 therefrom. Thus, the terminal or end portion of the wiping edge 42 is renewed and the wiping edge 42 itself is lengthened simultaneously.

Normally, a fractional horsepower electric motor may be used and a larger electric motor is not necessary. The guide 25 may be a V-rail and the lugs 35 are positioned so as to keep the guide 25 from moving markedly during operation of the apparatus. Preferably, the base 11 is constructed of plywood, and the guide 25 and supports 27 therefor may be constructed of metal, plastic or other suitable materials. The abrasive disc 18 may be an emery wheel of a prior art type satisfactory for abraiding rubber or rubber-like material.

The foregoing detailed description and the illustrative drawings are for purposes of illustration only, and are not intended as being limiting to the spirit or scope of the appended claims.

What is claimed is:

1. Portable apparatus for renovating used windshield wiper blades having wiping edges formed of a rubbery material on lower portions thereof comprising a portable base, an electric motor having a driven shaft extending horizontally therefrom, means for mounting the electric motor on the base, the electric motor being mounted on the top surface of the base and being positioned so that the shaft extends transversely across the base, an abrasive disc, means for rotatably mounting the disc on the driven shaft for rapid rotation around the axis thereof, the disc being mounted so that it rotates in a vertical plane which extends longitudinally with respect to the base, elongated guide means for the windshield wiper blade, the guide means having an elongated longitudinally extending slot formed therein for receiving at least a portion of the peripheral surface of the disc, supporting means mounted on the upper surface of the base for supporting the guide means generally above the disc with the upper peripheral surface of the disc extending upward into the slot, the guide supporting means including a pair of spaced pivotally mounted elongated supporting members, the pair of supporting members being on opposite sides of the disc and located at points remote therefrom, the guide means extending between the elongated supporting members and longitudinally with respect to the base, the supporting members extending in a generally upward direction from the base and being pivotally mounted on their inner ends and including means on the outer ends thereof for receiving and supporting the guide means, the supporting members being pivotable in a vertical plane which extends longitudinally with respect to the base and passes through the disc and the guide means so that the height above the surface of the base of the outer ends of the supporting members and the guide means supported thereby is adjustable by pivoting the supporting members, whereby the distance that the peripheral surface of the disc extends upward into the slot is adjustable to contact the wiping edge on the lower portion of the windshield wiper blade upon passing the blade along the guide means and across the slot to thereby remove damaged areas by abrasion and renovate the wiper blade.

2. The apparatus of claim 1 wherein the abrasive disc has a substantially flat peripheral surface.

3. The apparatus of claim 1 wherein the abrasive disc has an annular slot formed in the peripheral surface thereof, the slot having a width approximately equal to the thickness of the wiping edge of the wiper blade.

4. The apparatus of claim 1 wherein the guide means includes a member having a V-shaped cross section, the slot is formed in and extends longitudinally along the bottom portion of the V-shaped member, the outer ends of the supporting members are provided with V-shaped slots in which the V-shaped member rests without being attached thereto, and the V-shaped member is provided with lugs which are positioned to engage the supporting members and prevent marked movement thereof during operation of the apparatus.

References Cited

UNITED STATES PATENTS

| | | | |
|---|---|---|---|
| 2,286,886 | 6/1942 | Anderson | 51—98 |
| 2,570,302 | 10/1951 | Anderson | 51—74 |
| 2,724,219 | 11/1955 | Reaser | 51—102 X |
| 2,915,854 | 12/1959 | Ettman | 51—102 |

OTHER REFERENCES

American Journal of Railway Appliances, Aug. 15, 1887, p. 170.

ROBERT C. RIORDON, *Primary Examiner.*

D. G. KELLY, *Assistant Examiner.*